(12) United States Patent
Bellogi et al.

(10) Patent No.: US 7,117,837 B2
(45) Date of Patent: Oct. 10, 2006

(54) UNIT FOR SUPPLYING COMBUSTION AIR TO THE CYLINDERS OF AN ENDOTHERMIC ENGINE

(75) Inventors: Pietro Bellogi, Budrio (IT); Gianluca Mattogno, Frascati (IT); Renzo Moschini, Bologna (IT); Stefano Tartari, Casalecchio Di Reno (IT)

(73) Assignee: Magneti Marelli Powertrain, S.p.A., (IT)

( * ) Notice: Subject to any disclaimer, the term of this patent is extended or adjusted under 35 U.S.C. 154(b) by 4 days.

(21) Appl. No.: 10/866,171

(22) Filed: Jun. 10, 2004

(65) Prior Publication Data

US 2005/0022773 A1    Feb. 3, 2005

(30) Foreign Application Priority Data

Jun. 13, 2003   (IT)   ........................... BO2003A0362

(51) Int. Cl.
*F02M 35/10*   (2006.01)
(52) U.S. Cl. ............... 123/184.53; 123/184.21; 123/43 A; 123/43 AA
(58) Field of Classification Search ........... 123/184.21, 123/182.22, 184.24, 184.25, 184.34, 184.35, 123/184.53, 41.68, 41.7, 41.8, 43 A, 43 AA
See application file for complete search history.

(56) References Cited

U.S. PATENT DOCUMENTS 6,182,628 B1 * 2/2001 Kochs et al. .......... 123/184.21

6,406,033 B1   6/2002 Jessberger

FOREIGN PATENT DOCUMENTS

| DE | 197 39 424 | 3/1999 |
|----|-----------|--------|
| DE | 199 28 892 | 12/2000 |
| EP | 0 537 120 | 4/1993 |
| EP | 0 701 057 | 3/1996 |
| EP | 1 211 399 | 6/2002 |
| JP | 10-280962 | 10/1998 |
| JP | 10-299491 | 11/1998 |

OTHER PUBLICATIONS

European Search Report (Jul. 13, 2004).

* cited by examiner

*Primary Examiner*—Willis R. Wolfe
*Assistant Examiner*—Johnny H. Hoang
(74) *Attorney, Agent, or Firm*—Klarquist Sparkman, LLP

(57) ABSTRACT

Unit for supplying combustion air to the cylinders of an endothermic engine is provided with a manifold having an air inlet orifice and a plurality of supply ducts. Each supply duct extends between a first opening communicating with the manifold and an outlet orifice, and has a second opening arranged between the first opening and the outlet orifice. The supply unit is equipped with a valve member that can move between the first opening and the second opening in order to close alternately the first opening and the second opening.

12 Claims, 3 Drawing Sheets

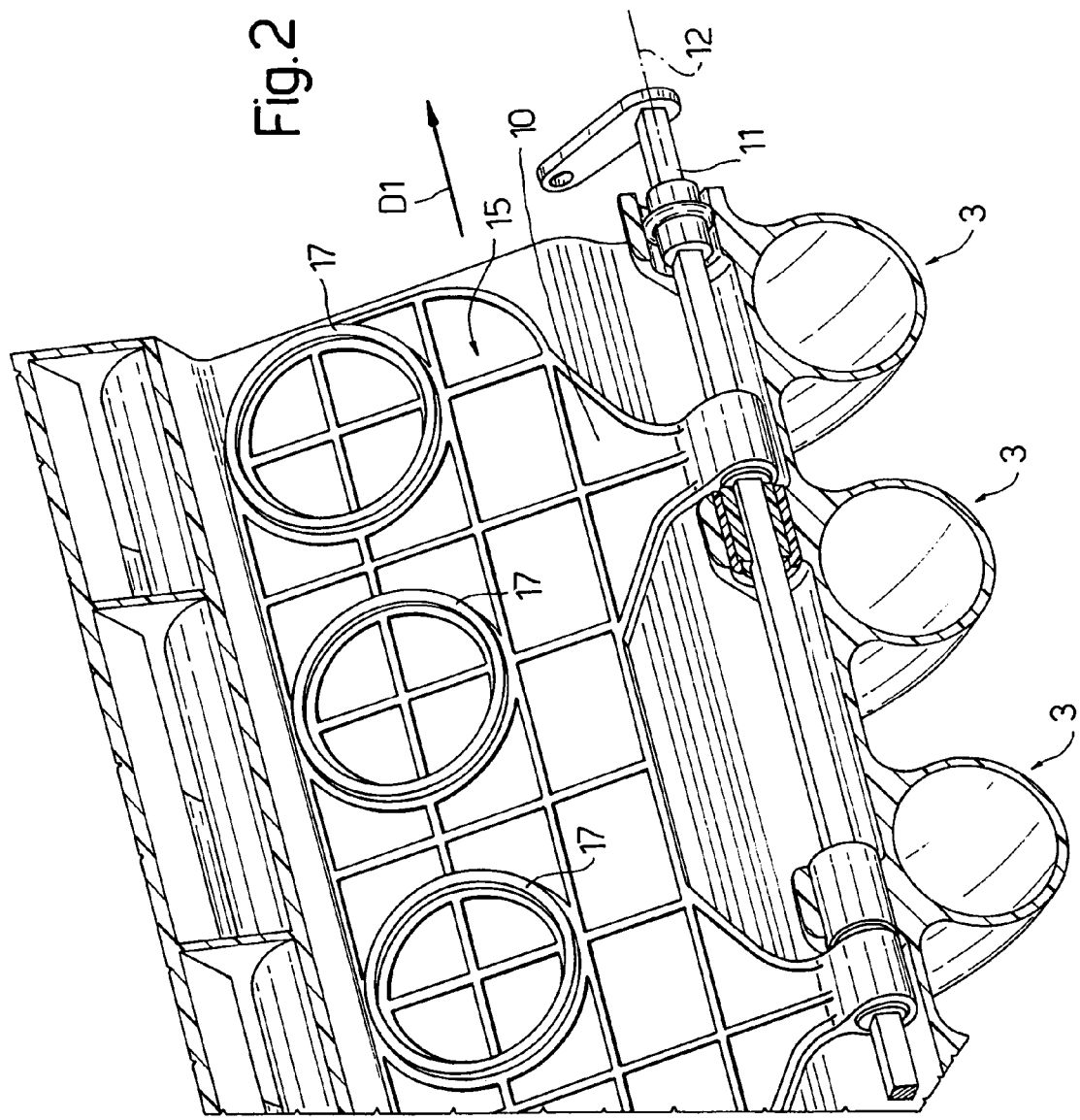

UNIT FOR SUPPLYING COMBUSTION AIR TO THE CYLINDERS OF AN ENDOTHERMIC ENGINE

The present invention relates to a unit for supplying combustion air to the cylinders of an endothermic engine.

CROSS REFERENCE TO RELATED APPLICATIONS

This application claims priority under 35 U.S.C. § 119 from Italian Patent Application No. BO2003A 000362, filed Jun. 13, 2003. The prior application is incorporated herein by this reference.

BACKGROUND

In general, an air supply unit comprises a manifold having an air inlet orifice and a plurality of supply ducts, which are in communication with the manifold and have respective outlet orifices, each of which is capable of supplying a respective cylinder of the internal combustion engine. Some supply units are made with supply ducts that have variable geometry. In this specific case, each supply duct communicates with the manifold through a first and a second opening, which are arranged in different zones of the supply duct in such a manner as to define a first complete path of air along the supply duct, which path is delimited by the first opening and the outlet orifice, and a second shorter path that extends between the second opening and the outlet orifice. The second path is thus part of the first path. Moreover, a valve for selectively opening and closing the second opening is fitted in correspondence with second opening. The unit of this configuration has the function of selecting the preferred path depending upon the operation of the endothermic engine: when the rotational speed of the endothermic engine is low and high torque is required, it is preferable for the path followed by the combustion air to be long and the valve is thus in the closed position; when the rotational speed of the endothermic engine is high and high power is required, it is preferable for the path followed by the air to be short and the valve is thus in the open position. From a functional standpoint, the valve of each supply duct is actuated depending on the rotational speed of the endothermic engine.

The unit described above has a number of disadvantages: the first disadvantage is that fitting a valve in each second opening is a complex and costly operation; the second disadvantage is that the unit has no valve in correspondence with the first opening and, although the combustion air is preferably channelled over the second, shorter, path, a certain quantity of combustion air passes through the first path, so reducing the advantage of providing supply ducts having variable geometry.

SUMMARY

The aim of the present invention is to provide a unit for supplying combustion air to the cylinders of an internal combustion engine, which unit has none of the disadvantages of the prior art and which, in particular, is particularly efficient and easy to produce.

The present invention provides a unit for supplying combustion air to the cylinders of an endothermic engine which comprises a manifold having an air inlet orifice; and at least one supply duct for each cylinder; each supply duct extends between a first opening communicating with the manifold and an outlet orifice and has a second opening arranged between the first opening and the outlet orifice; the unit being characterised in that it comprises a bulkhead that can move between the first opening and the second opening in order to close alternately the first opening and the second opening.

The bulkhead can preferably be rotated about a specific axis.

According to a preferred embodiment, the first opening is delimited by a first edge resting on a first plane and in that the second opening is delimited by a second edge resting on second plane; the first plane and the second plane intersecting in the vicinity of said specific axis.

BRIEF DESCRIPTION OF THE DRAWINGS

The present invention will now be described with reference to the attached drawings, which illustrate some non-limiting embodiments of the invention, in which:

FIG. 2 is a perspective view in cross section of the unit in FIG. 1;

DETAILED DESCRIPTION

Figure 1:
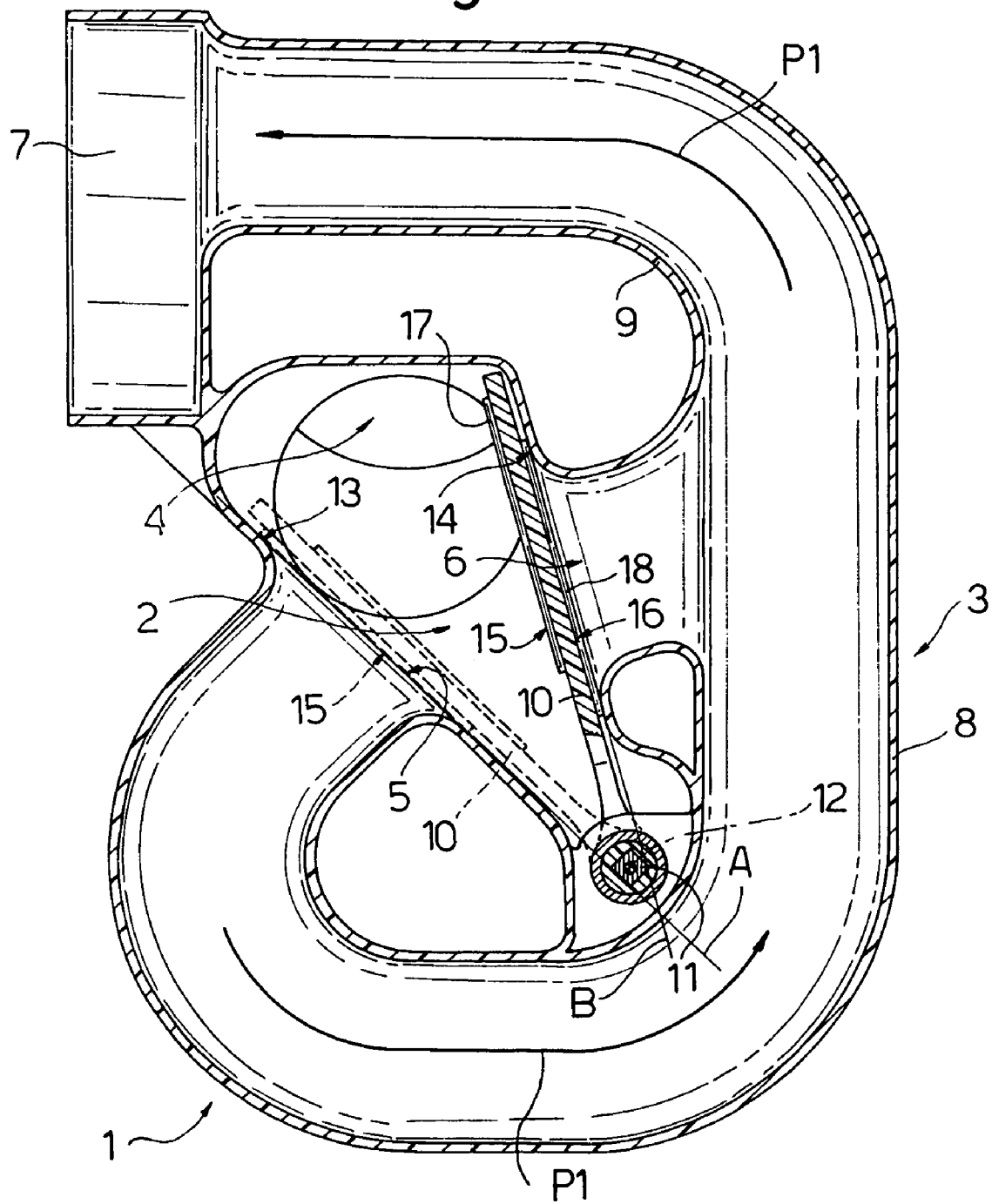
FIG. 1 is a side view in cross section of a unit for supplying combustion air to the cylinders of an endothermic engine produced according to the present invention.

With reference to FIG. 1, 1 denotes the overall unit for supplying combustion air to the cylinders of an endothermic engine not shown in the attached figures.

The unit 1 comprises a manifold 2 and a series of ducts 3 (FIG. 2), each of which is capable of supplying combustion air to a respective cylinder. The manifold 2 has an elongated shape in a direction D1 perpendicular to the plane of the page in FIG. 1, while each duct 3 extends along an arcuate path P1 around the direction D1. The manifold 2 has an inlet orifice 4 and two openings 5 and 6 communicating with the duct 3. The duct 3 is delimited at the opposite ends thereof by the opening 6 and by an output orifice 7 and has an outer wall 8 and an inner wall 9, along which is arranged the opening 6.

The unit 1 comprises a bulkhead 10, which is arranged within the manifold 2, is fitted on a shaft 11 and can be rotated about an axis 12 parallel to the direction D1.

Each opening 5 is delimited by an edge 13 that rests on a plane A, while each opening 6 is delimited by an edge 14 that rests on a plane B. The axis 12 is arranged in the vicinity of the intersection of the A and of the plane B, such that the bulkhead 10 is capable of coupling both with the openings 5 and with the openings 6. In theory, if the bulkhead 10 were of zero thickness, the axis 12 would coincide with the intersection of the planes A and B.

The bulkhead 10 has a first face 15 capable of coupling with the openings 5 and a second face 16 capable of coupling with the openings 6. The faces 15 and 16 have respective gaskets 17 and 18 capable of co-operating respectively with the edges 13 and 14.

Figure 3:
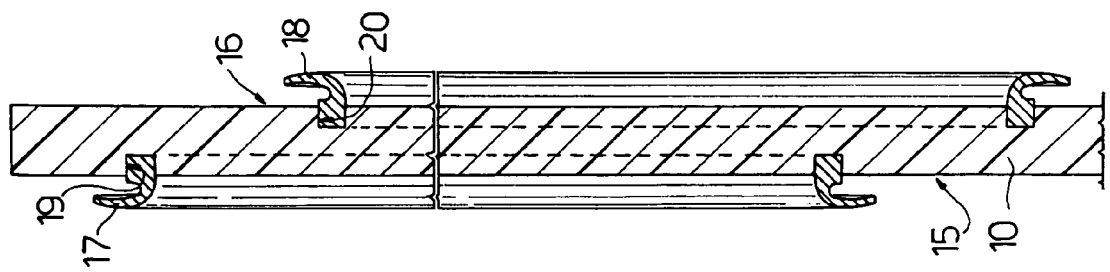
FIG. 3 is a view in cross section of a component of the unit in FIG. 1.

As is shown more clearly in FIG. 3, the gaskets 17 and 18 are defined by annular elements partly accommodated in respective seats 19 and 20 provided in the bulkhead 10 and adhesively bonded to the bulkhead 10.

The gaskets 17 and 18 are radially offset relative to the axis 12, as shown in FIG. 3, when, as shown in FIG. 1, the openings 5 and 6 are located at different distances from the axis 12.

In service, each cylinder aspirates the quantity of combustion air required for operation of the engine through the manifold 1. The bulkhead 10 is displaced by a control member, not shown in the attached figures, from the position shown in solid lines in FIG. 1 to the position shown in dashed lines in FIG. 1 and vice versa. The control member, which is not shown, performs the above-described displacements as a function of the rotational speed of the engine: at a relatively low rotational speed of the engine and high torque, the bulkhead 10 is placed in the position shown in solid lines corresponding to the "long" supply duct 3; at a high rotational speed and high power, the bulkhead 10 is placed in the position shown in dashed lines corresponding to the "short" supply duct 3. In the above-described positions, the gaskets 17 and 18 alternately provide a seal against the respective edges 13 and 14.

According to the variant in FIG. 2, when the openings 5 and 6 are located at the same distance from the axis 12, the gaskets 17 and 18 are arranged opposite one another.

Figure 5:
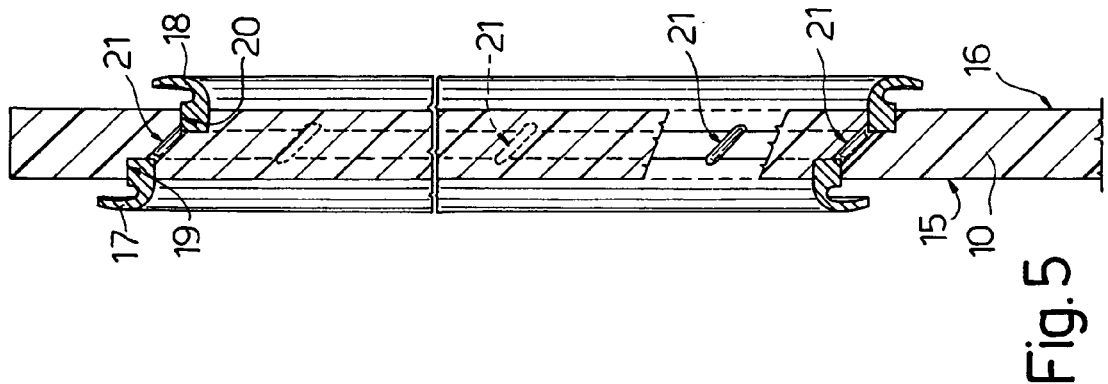
FIG. 5 is a view in cross section of another variant of the component in FIG. 3.
Figure 4:
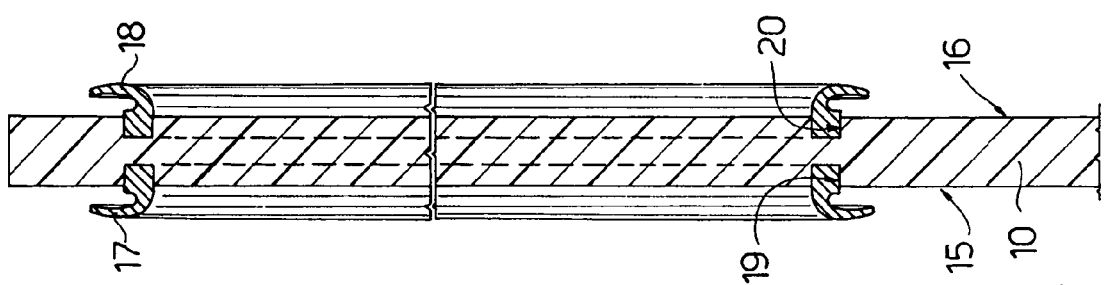
FIG. 4 is a view in cross section of a variant of the component in FIG. 3.

According to the further variant in FIG. 5, the gaskets 17 and 18 are made of rubber and are injection molded directly onto the bulkhead 10 by the fact that the seats 19 and 20 communicate through the holes 21, and the gaskets 17 and 18 are connected together by the rubber that has penetrated into the holes 21 during the injection molding phase. In this manner, it is possible to dispense with attaching the gaskets 17 and 18 with adhesive.

According to a variant that is not shown, the bulkhead 10 can be replaced by a series of bulkheads, each of which is of dimensions so as to co-operate with a single duct 3 or with a group of ducts 3. In fact, the advantage of using the bulkhead 10 or a series of bulkheads resides in the possibility of closing either the opening 5 or the opening 6 without increasing the complexity of the unit 1. From this standpoint, having a single bulkhead 10 for all the supply ducts 3 is equivalent to having more mutually aligned bulkheads.

The invention claimed is:

1. Unit for supplying combustion air to the cylinders of an endothermic engine comprises a manifold having an air inlet orifice; and at least one supply duct for each cylinder; each supply duct extends between a first opening communicating with the manifold and an outlet orifice, and has a second opening arranged between the first opening and the outlet orifice; the unit being characterised in that it comprises a bulkhead that can move between the first opening and the second opening in order to close alternately the first opening and the second opening, and wherein a first air passageway is defined when the bulkhead closes the second opening and a second air passageway is defined when the bulkhead closes the first opening, the second air passage being a portion of the first air passage.

2. Unit according to claim 1, characterised in that said bulkhead can be rotated about a specific axis.

3. Unit according to claim 2, characterised in that the first opening is delimited by a first edge resting on a first plane and that the second opening is delimited by a second edge resting on a second plane; the first plane and the second plane intersecting in the vicinity of said specific axis.

4. Unit according to claim 1, characterised in that said bulkhead comprises a first face capable of coupling with the first opening and a second face capable of coupling with the second opening.

5. Unit according to claim 4, characterised in that it comprises a first gasket arranged along the first face and a second gasket arranged along the second face; the first gasket and the second gasket respectively being capable of coupling with the first edge and the second edge.

6. Unit according to claim 5, characterised in that the first gasket and the second gasket are respectively engaged in a first seat and in a second seat of said bulkhead.

7. Unit according to claim 6, characterised in that said bulkhead has holes to place the first seat in communication with the second seat; said first gasket and second gasket being connected to one another through said holes.

8. Unit according to claim 7, characterised in that said first gasket and second gasket are simultaneously injection molded onto said bulkhead.

9. Unit according to claim 1, characterised in that it comprises a plurality of supply ducts and a single bulkhead extending in correspondence with the first openings and the second openings of said supply ducts.

10. Unit according to claim 1, characterised in that it comprises a first number of supply ducts and a second number of bulkheads fitted on a common shaft; each bulkhead extending in correspondence with at least one first opening and one second opening.

11. A unit for supplying combustion air to combustion areas of an endothermic engine, comprising:
at least one supply duct for one of the combustion areas, the supply duct extending between a first opening at a first end that communicates with a manifold through which combustion air is received and an outlet orifice at a second end through which the combustion air is conveyed;
a second opening defined in the supply duct between the first opening and the outlet orifice; and
a valve that can move between the first opening and the second opening to alternately close the first opening and to close the second opening, the valve thereby being operable to select one of two different flow paths for the combustion air flowing through the supply duct to the outlet orifice.

12. The unit of claim 11, wherein the valve has a first face shaped to close against the first opening and an opposite second face shaped to close against the second opening.

* * * * *